(12) United States Patent
Ryu et al.

(10) Patent No.: US 10,929,640 B2
(45) Date of Patent: Feb. 23, 2021

(54) FLAT PANEL DISPLAY WITH OPTICAL IMAGE SENSOR EMBEDDED THEREIN

(71) Applicant: LG Display Co., Ltd., Seoul (KR)

(72) Inventors: Seungman Ryu, Paju-si (KR); Joobong Hyun, Paju-si (KR); Ara Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 154 days.

(21) Appl. No.: 16/124,494

(22) Filed: Sep. 7, 2018

(65) Prior Publication Data
US 2019/0073515 A1  Mar. 7, 2019

(30) Foreign Application Priority Data
Sep. 7, 2017  (KR) .................. 10-2017-0114294

(51) Int. Cl.
*G06F 3/042* (2006.01)
*G06K 9/00* (2006.01)
(Continued)

(52) U.S. Cl.
CPC ......... *G06K 9/00087* (2013.01); *G02B 6/005* (2013.01); *G02B 6/0016* (2013.01);
(Continued)

(58) Field of Classification Search
CPC .......... G06K 9/00087; G06K 9/00046; G06K 9/0004; G02F 1/133502; G02F 1/13338; G02F 2001/133331; G02B 6/0016; G02B 6/0091; G02B 6/0023; G02B 6/005; G02B 6/006; G06F 2203/04109; G06F 3/042; G06F 3/0412; H01L 27/3227
See application file for complete search history.

(56) References Cited

U.S. PATENT DOCUMENTS 5,877,874 A    3/1999  Rosenberg
2007/0013679 A1  1/2007  Gruhlke
(Continued)

FOREIGN PATENT DOCUMENTS

CN     105184282 A     12/2015
KR  10-2001-0022006 A    3/2001
(Continued)

*Primary Examiner* — Lunyi Lao
*Assistant Examiner* — Jarurat Suteerawongsa
(74) *Attorney, Agent, or Firm* — Morgan, Lewis & Bockius LLP

(57) ABSTRACT

The present disclosure relates to a flat panel display with an optical image sensor embedded therein. The flat panel display includes a directional light unit. The directional light unit comprises a cover substrate with a surface area corresponding to the length and width; a first low refractive index layer attached to the lower surface of the cover substrate; a light-exiting element disposed to correspond to the display area, on the lower surface of the first low refractive index layer; a light-entering element disposed outside the display area at one side of the light-exiting element, on the lower surface of the first low refractive index layer; a second low refractive index layer disposed on the lower surfaces of the light-exiting element and light-entering element and attached to the upper surface of the display panel; and a light source disposed to face the light-entering element.

8 Claims, 4 Drawing Sheets

(51) Int. Cl.
  *F21V 8/00*    (2006.01)
  *G02F 1/1333*  (2006.01)
  *G06F 3/041*   (2006.01)
  *G02F 1/1335*  (2006.01)

(52) U.S. Cl.
  CPC ......... *G02B 6/0023* (2013.01); *G02B 6/0091* (2013.01); *G02F 1/13338* (2013.01); *G02F 1/133502* (2013.01); *G06F 3/042* (2013.01); *G06F 3/0412* (2013.01); *G06K 9/0004* (2013.01); *G02B 6/006* (2013.01); *G02F 2001/133331* (2013.01); *G06F 2203/04109* (2013.01)

(56) References Cited

U.S. PATENT DOCUMENTS

| | | | |
|---|---|---|---|
| 2012/0154725 A1* | 6/2012 | Jeon ................... | G02F 1/13338 349/110 |
| 2013/0063399 A1 | 3/2013 | Noro et al. | |
| 2015/0185393 A1* | 7/2015 | Bang .................. | G02B 6/0023 362/608 |
| 2016/0342282 A1* | 11/2016 | Wassvik .............. | G02F 1/13338 |
| 2017/0270340 A1 | 9/2017 | Gao et al. | |
| 2017/0315293 A1 | 11/2017 | Bang et al. | |

FOREIGN PATENT DOCUMENTS

| | | |
|---|---|---|
| KR | 10-2017-0124160 A | 11/2017 |
| WO | 2009/010940 A2 | 1/2009 |
| WO | 2015/108477 A1 | 7/2015 |

\* cited by examiner

FLAT PANEL DISPLAY WITH OPTICAL IMAGE SENSOR EMBEDDED THEREIN

This application claims the benefit of Korean Patent Application No. 10-2017-0114294 filed on Sep. 7, 2017, the entire contents of which is incorporated herein by reference for all purposes as if fully set forth herein.

BACKGROUND

Technical Field

The present disclosure relates to a flat panel display with an image sensor, such as a fingerprint recognition sensor, embedded therein, and more particularly, to a flat panel display with an optical image sensor embedded therein, that comprises an ultrathin film substrate providing directional light and an optical image sensor.

Discussion of the Related Art

With the advance of computer technology, computer-based systems for various purposes, such as laptop computers, tablet PCs, smartphones, personal digital assistants, automated teller machines, search guidance systems, etc., have been developed. These systems usually store a lot of confidential data such as business information or trade secrets, as well as personal information about the private lives of individuals. Therefore, there is a need to strengthen security to protect such data.

To this end, a method for strengthening security using an image sensor capable of sensing biological information was conventionally proposed. A known example of such an image sensor is a fingerprint sensor that can strengthen security by registering or authenticating with a system via fingerprint. A fingerprint sensor is a sensor that detects a human fingerprint. Fingerprint sensors are broadly categorized into optical fingerprint sensors and capacitive fingerprint sensors.

An optical fingerprint sensor internally illuminates a fingerprint using a light source and detects light reflected by the ridges of the fingerprint by a CMOS (complementary metal oxide semiconductor) image sensor. The optical fingerprint sensor needs additional equipment for scanning using light. Conventionally known optical scanning equipment has its limitations in increasing scanning area. This makes it hard to use the optical scanning equipment in a wide range of applications, such as combining it with a display device.

The capacitive fingerprint sensor uses the difference in electric charge between ridges and valleys touching the fingerprint sensor. A conventional capacitive fingerprint sensor is in the form of an assembly combined with a particular push button, and comprises a silicon wafer, imprinted with a circuit for measuring the capacitance between a capacitive plate and a user's fingerprint (including the ridges and valleys).

Integrating a high-resolution sensor array and an IC together using the silicon wafer requires a complex assembly structure, thus increasing the size of a non-display area, a.k.a., bezel. Moreover, the push button (e.g., the home key on a smartphone) doubles as a fingerprint sensor, which leads to an increase in thickness and makes the fingerprint sensing area dependent on the size of the push button.

To solve these problems, technologies have been developed, such as the technology that uses a touch sensor screen area as a fingerprint identification area. A protection film for protecting a display panel is often attached to a handheld personal display such as a smartphone. When a display area on the handheld personal display is used as an area for fingerprint recognition, attaching a protection film to it may considerably degrade the fingerprint recognition functionality.

There is an increasing demand for fingerprint recognition sensors with an ultrathin film structure that can be easily combined with a display device. However, due to the aforementioned problems, it is necessary to develop a completely novel optical image sensor, which is distinct from the existing structure, and a flat panel display having the same embedded therein.

SUMMARY

Accordingly, embodiments of the present disclosure are directed to a flat panel display with an optical image sensor embedded therein that substantially obviates one or more of the problems due to limitations and disadvantages of the related art.

An aspect of the present disclosure is to provide a flat panel display with an optical image sensor embedded therein. Another aspect of the present disclosure is to provide a flat panel display with an optical image sensor embedded therein, that is capable of sensing an image in the entire or most of a display area of a display panel. Still another aspect of the present disclosure is to provide a flat panel display with an optical image sensor embedded therein, that provides directional light as detection light over a large area. A further aspect of the present disclosure is to provide a flat panel display with an optical image sensor embedded therein, that has high detection resolution and high sensitivity by guiding directional light within some layers in a cover glass. A further aspect of the present disclosure is to provide a flat panel display with an optical image sensor embedded therein, that eliminates interference between a printing element disposed in a non-display area of a cover substrate and elements for the optical image sensor.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a flat panel display with an optical image sensor embedded therein comprises: a display panel on which a display area and a non-display area are defined; and a directional light unit with a length and width for accommodating the display panel and a given thickness, that is attached to the upper surface of the display panel, wherein the directional light unit comprises: a cover substrate with a surface area corresponding to the length and width; a first low refractive index layer attached to the lower surface of the cover substrate; a light-exiting element disposed to correspond to the display area, on the lower surface of the first low refractive index layer; a light-entering element disposed outside the display area at one side of the light-exiting element, on the lower surface of the first low refractive index layer; a second low refractive index layer disposed on the lower surfaces of the light-exiting element and light-entering element and attached to the upper surface of the display panel; and a light source disposed to face the light-entering element.

In an embodiment, the light source provides incident light to an incident point defined on the light-entering element, the light-entering element comprises a holographic pattern that converts the incident light into traveling light with an incident angle so that the traveling light is totally reflected within the light-exiting element and enters the light-exiting element, and the light-exiting element comprises a holographic pattern that converts some of the traveling light into detection light with a reflection angle so that the detection light is totally reflected off the upper surface of the cover substrate and passes through the first low refractive index layer and the second low refractive index layer.

In an embodiment, the incident angle is greater than the total reflection critical angle at the interface between the light-exiting element and the second low refractive index layer and greater than the total reflection critical angle at the interface between the light-exiting element and the first low refractive index layer.

In an embodiment, the reflection angle is greater than the total reflection critical angle at the interface between the cover substrate and an air layer and smaller than the total reflection critical angle at the interface between the light-exiting element and the second low refractive index layer.

In an embodiment, the traveling light has a spread angle on a horizontal plane consisting of an axis along the width and an axis along the length, and remains collimated as initially on a vertical plane consisting of an axis along the length and an axis along the thickness.

In an embodiment, the spread angle is greater than or equal to the interior angle of two line segments connecting from the incident point to two end points on the other side of the cover substrate opposite the light-entering element.

In an embodiment, the flat panel display further comprises a decorative layer disposed on at least either one side or the other side of the lower surface of the cover substrate, corresponding to the non-display area.

In an embodiment, the light-entering element and the light source are disposed under the decorative layer.

The present disclosure may provide a flat panel display with an optical image sensor embedded therein, that has high-resolution image sensing capability by providing directional light as detection light. The present disclosure may provide a flat panel display with an optical image sensor embedded therein, that allows for large-area recognition because detection light is provided by spreading collimated infrared laser light over a large area corresponding to a display area of a display panel by using holographic technology. The present disclosure may provide a flat panel display with an ultrathin film-type optical image sensor embedded therein, that has the shape of a thin film over the screen of an existing flat panel display and provides directional light as detection light. Moreover, in the present disclosure, a cover glass (or protection substrate) attached to the outermost surface of the display device may be used as the cover substrate of the directional light unit according to the present disclosure. Furthermore, an ultrathin directional optical substrate is provided which spreads collimated light over a large area using a holographic film. Accordingly, the display device does not become thicker even if the optical image sensing device according to the present disclosure is combined with the display device.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Figure 1A:
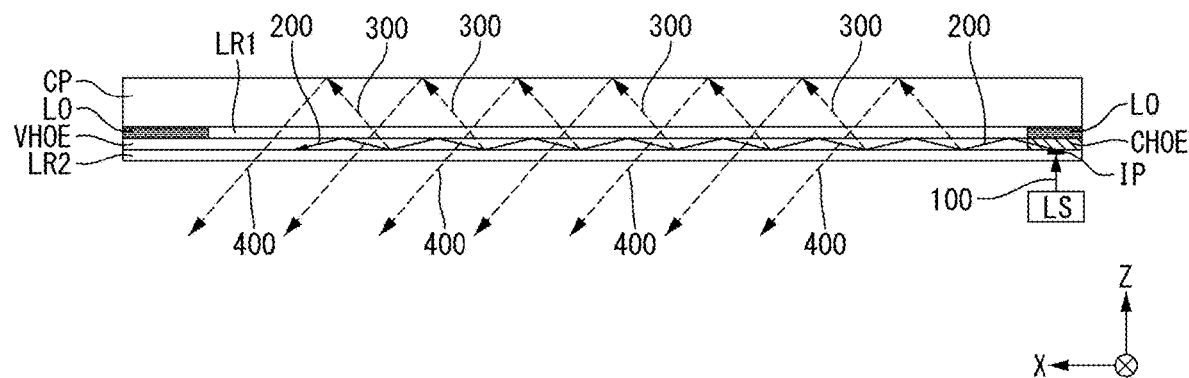
FIGS. 1A and 1B are a view showing a structure of a directional light unit applied to a flat panel display with an optical image sensor embedded therein according to an exemplary embodiment of the present disclosure.

Hereinafter, exemplary embodiments of the present disclosure will be described with reference to the attached drawings. Throughout the specification, the same reference numerals indicate substantially the same components. When it is deemed that a detailed description of well-known functions or configurations related to the present disclosure may unnecessarily obscure the subject matter of the present disclosure, the detailed description will be omitted. The terms and names of elements used herein are chosen for ease of description and may be different from the names of parts used in actual products.

Figure 1B:
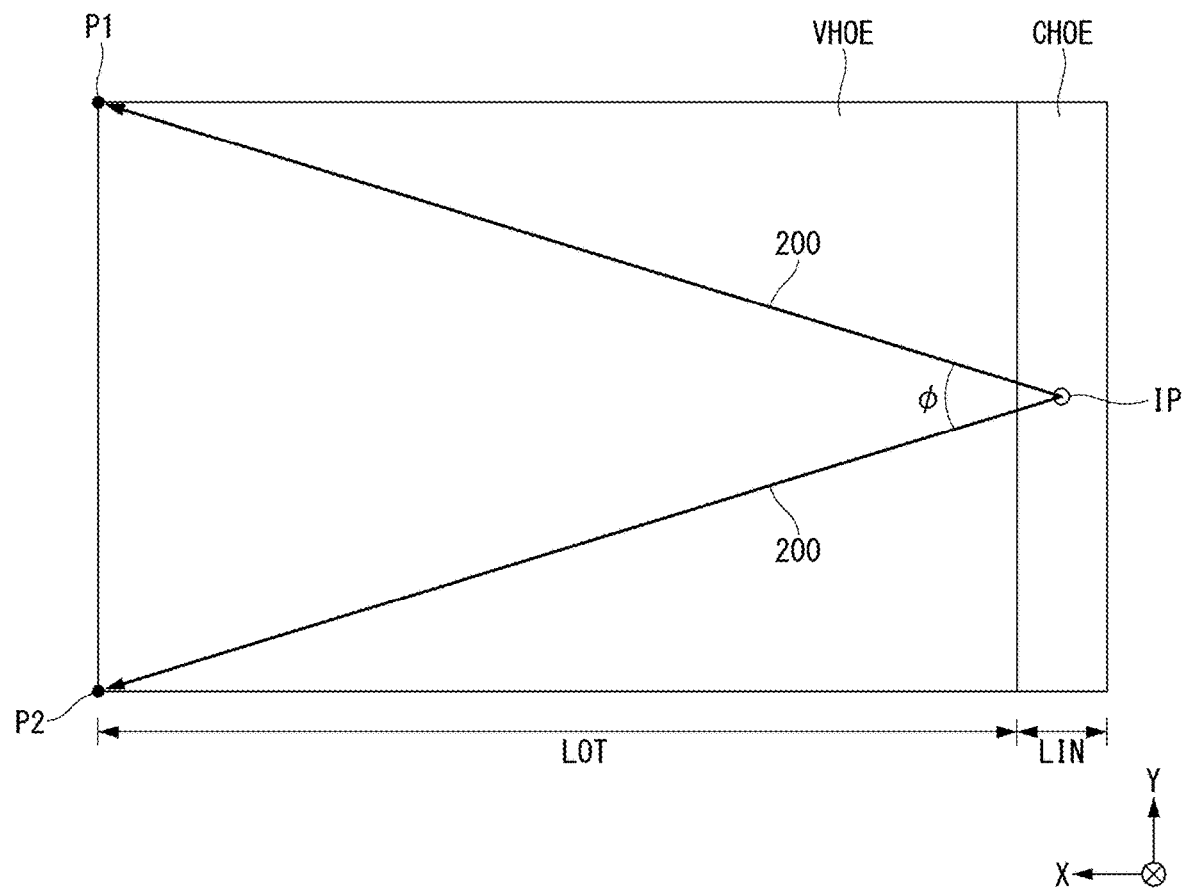
Figure 2:
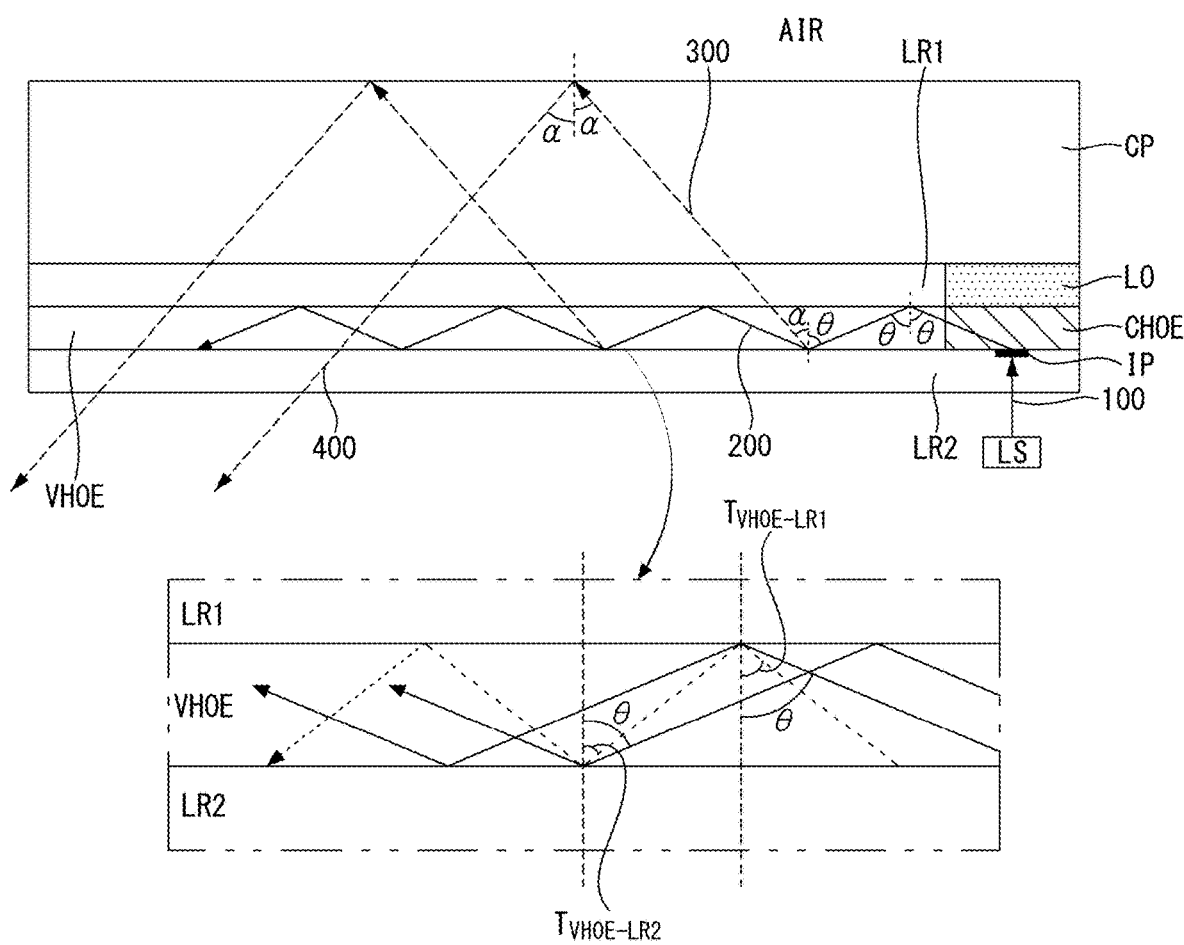
FIG. 2 is a cross-sectional view of a light path within the directional light unit of FIG. 1.

Referring to FIGS. 1A, 1B and 2, an exemplary embodiment of the present disclosure will be described below. FIGS. 1A and 1B are a view showing a structure of a directional light unit applied to a flat panel display with an optical image sensor embedded therein according to an exemplary embodiment of the present disclosure. FIG. 1A is a side view from the XZ plane, and FIG. 1B is a plan view from the XY plane.

Referring to FIGS. 1A and 1B, a directional light unit according to an exemplary embodiment of the present disclosure comprises a directional light substrate SLS and a light source LS. The directional optical unit is an optical device that spreads collimated light over a large area. Thus, it is preferable that the light source LS provides collimated light.

The directional light substrate SLS comprises a cover substrate CP, a decorative layer LO, a light-exiting element VHOE, a light-entering element CHOE, a first low refractive index layer LR1, and a second low refractive index layer LR2. The cover plate CP may have a rectangular plate shape with a length, a width and a thickness. In FIGS. 1A and 1B, the length is indicated along the X-axis, the width is indicated along the Y-axis, and the thickness is indicated along the Z-axis. The length of the cover substrate CP runs along the X-axis, the width thereof runs along the Y-axis, and the thickness thereof runs along the Z-axis.

The decorative layer LO may be disposed on one side and the other side of the lower surface of the cover substrate CP.

The decorative layer LO is a component for decorating a product with a logo, trademark, or advertisement. The decorative layer LO may be disposed usually on the top, bottom, left, or/and right side of the display device, which corresponds to a non-display area. The first low refractive index layer LR1 is applied onto the lower surface of the cover substrate CP where the decorative layer LO is disposed. As shown in FIG. 1, the decorative layer LO and the low refractive index layer LR1 are formed on the same layer on the lower surface of the cover substrate CP. The decorative layer LO is disposed on both sides of the lower surface of the cover substrate CP, with the first low refractive index layer LR1 interposed in between. Alternatively, the first low refractive index layer LR1 may be disposed to cover the entire decorative layer LO.

The decorative layer LO may be a transparent or opaque film with letters or figures printed or etched on it. Alternatively, the decorative layer LO may have letters or figures that are coated directly onto the lower surface of the cover substrate CP. Alternatively, the decorative layer LO may be a pattern formed on a film or a pattern formed on the lower surface of the cover substrate CP.

The light-exiting element VHOE and the light-entering element CHOE are surface-bonded to the lower surface of the cover substrate CP. For example, the light-exiting element VHOE may be surface-bonded to the lower surface of the first low refractive index layer LR1. Meanwhile, the light-entering element CHOE may be surface-bonded to the lower surface of the decorative layer LO. The light-exiting element VHOE is an optical device that provides outgoing light 300. Thus, the light-exiting element VHOE is disposed to correspond to an image detection and sensing area.

The light-entering element CHOE is an optical device that makes collimated light from the light source LS have directionality as it spreads over an area corresponding to the cover substrate CP. Preferably, the light-entering element CHOE may be disposed on the outer edge of the light-exiting element VHOE. Particularly, the light-entering element CHOE is disposed to face the light source LS.

The light-exiting element VHOE and the light-entering element CHOE may be disposed on the same plane. To take the manufacturing process into consideration, it is desirable that the light-exiting element VHOE and the light-entering element CHOE are formed in separate areas on a single film. The light-exiting element VHOE and the light-entering element CHOE each may be an optical element comprising a holographic pattern. In this case, a master film with a pattern of the light-exiting element VHOE and a master film with a pattern of the light-entering element CHOE may be disposed adjacent to each other, and the two holographic patterns may be duplicated simultaneously on a single holographic recording film.

The second low refractive index layer LR2 is stacked on the lower surfaces of the light-exiting element VHOE and light-entering element CHOE. Preferably, the first low refractive index layer LR1 and the second low refractive index layer LR2 have the same refractive index. Preferably, the first and second low refractive index layers LR1 and LR2 have a lower refractive index than the cover substrate CP, light-exiting element VHOE, and light-entering element CHOE.

For example, the cover substrate CP may be made of a transparent reinforced glass with a refractive index of 1.5. The light-exiting element VHOE and the light-entering element CHOE are transparent holographic recording films, and their refractive index may be equal to or slightly higher than that of the cover substrate CP. Here, for convenience of explanation, a description will be given on the assumption that the refractive index of the light-exiting element VHOE and light-entering element CHOE is equal to the refractive index of the cover substrate CP.

The refractive index of the first and second low refractive index layer LR1 and LR2 is preferably equal to or slightly higher than the refractive index of an image object to be sensed. When applied to fingerprint recognition, the first low refractive index layer LR1 and the second low refractive index layer LR2 may have a refractive index of about 1.4 which is close to the refractive index of the human skin, 1.39.

As a result, the light-exiting element VHOE with a refractive index of 1.5 is interposed between the first low refractive index layer LR1 and second low refractive index layer LR2 with a refractive index of 1.4. This means that low refractive index layers are stacked on the upper and lower surfaces of a high refractive index layer, which allows light to travel as it is totally reflected within the high refractive index layer. That is, the thickness area of the light-exiting element VHOE interposed between the first and second low refractive index layers LR1 and LR2 serves as a light guiding space for spreading light used for image detection over the entire surface of the display panel.

The light source LS is disposed opposite the light-entering element CHOE to face the light-entering element CHOE. It is desirable that the light source LS provides highly-collimated single wavelength light like a laser. Preferably, infrared laser light, which is invisible to the human eye, is provided, especially when a system with a fingerprint recognition feature embedded therein is applied to a handheld display device.

Collimated light from the light source LS is incident light 100, which has a given cross-sectional area and is provided to an incident point IP defined on the light-entering element CHOE. It is desirable that the incident light 100 enters in a direction normal to the surface of the incident point IP. However, the present disclosure is not limited to this, and if necessary, the incident light 100 may enter at an oblique angle from the direction normal to the surface of the incident point IP.

The light-entering element CHOE convert the incident light 100 into traveling light 200 with an incident angle, and sends it to the inside of the light-exiting element VHOE. Here, it is desirable that the incident angle is greater than the internal total reflection critical angle of the light-exiting element VHOE. As a result, the traveling light 200 is totally reflected within the light-exiting element VHOE and travels along the X-axis corresponding to the length of the cover substrate CP.

The light-exiting element VHOE converts some of the traveling light 200 into outgoing light 300 and refracts it off the upper surface of the cover substrate CP. The remaining part of the traveling light 200 stays the same and therefore is totally reflected and travels within the light-exiting element VHOE. The outgoing light 300 passes through the first low refractive index layer LR1 on the upper surface of the light-exiting element VHOE and enters the cover substrate CP.

The outgoing light 300 is totally reflected off the upper surface of the cover substrate CP since the upper surface of the cover substrate CP is in contact with an air layer with a refractive index of 1.0. The outgoing light 300, after totally reflected off the upper surface of the cover substrate CP, serves as detection light (or sensing light) 400. The detection light 400 passes through the first low refractive index layer LR1 on the lower surface of the cover substrate CP and enters the light-exiting element VHOE. Also, the detection light 400 passes through the second low refractive index layer LR2 disposed on the lower surface of the light-exiting element VHOE and exits the directional light substrate SLS. That is, the outgoing light 300 is totally reflected off the upper surface of a first cover substrate CP1 and serves as detection light 400 that passes through lower surface of a second cover substrate CP2.

As the traveling light 200 travels from one side, where the light-entering element CHOE is disposed, to the opposite side, part of the outgoing light 300 is emitted by the light-exiting element VHOE. In this case, the amount of outgoing light 300 is determined by the light extraction efficiency of the light-exiting element VHOE. For example, if the light extraction efficiency of the light-exiting element VHOE is 3%, 3% of the initial incident light 100 is extracted as the outgoing light 300, in a first light-emission region where the traveling light 200 first touches the light-exiting element VHOE. 97% of the traveling light 200 continues to be totally reflected and travel. Afterwards, in a second light-emission region, 2.91% of the initial incident light 100, which equals 3% of the remaining 97%, is extracted as the outgoing light 300.

In this way, the outgoing light 300 is extracted as the traveling light 200 travels within the light-exiting element VHOE until it reaches the far edge of the cover substrate CP. If the light-exiting element VHOE has uniform light extraction efficiency, the amount of light extraction is gradually decreased as the traveling light 200 travels. In order to keep the amount of outgoing light 300 constant as the traveling light 200 travels, it is desirable that the light extraction efficiency of the light-exiting element VHOE is designed to increase exponentially.

When viewed on the XZ plane (or 'vertical plane') consisting of axes along the length and thickness, the traveling light 200 remains collimated as the incident light 100 was. On the other hand, the traveling light 200 preferably has a spread angle ($\varphi$) on the XY plane (or 'horizontal plane') consisting of axes along the length and width, in order to provide an image detection area corresponding to the surface area of the cover substrate CP. For example, it is desirable that the light-exiting element VHOE is situated corresponding to most of the surface area of the cover substrate CP as much as possible. Also, the spread angle ($\varphi$) is greater than or equal to the interior angle of two line segments connecting from the incident point IP to two end points P1 and P2 on the other side of the cover substrate CP opposite the light-entering element CHOE.

The region where the light-entering element CHOE is situated may be defined as a light input portion LIN. The region where the light-exiting element VHOE is situated may be defined as a light output portion LOT. Also, the light output portion LOT may be a light travel portion along which light travels. Although FIGS. 1A and 1B illustrates that the light-entering element CHOE is disposed to cover the entire area of the light input portion LIN, it may be slightly larger in size than the incident point IP.

For example, if the cross-sectional area of collimated light from the light source LS is 0.5 mm×0.5 mm, the light-entering element CHOE may have a length corresponding to the width of the cover substrate CP and a width of around 3 mm to 5 mm. The light-entering element CHOE may be situated across the width of the cover substrate CP.

Referring to FIG. 2, a description will be given below about along which path within the directional light substrate SLS collimated light from the light source is converted into directional infrared light used for image detection. FIG. 2 is a cross-sectional view of a light path within the directional light unit of FIGS. 1A and 1B.

The incident light 100 from the light source LS enters in a direction normal to the surface of the incident point IP on the light-entering element CHOE. The light-entering element CHOE converts the incident light 100 into traveling light 200 which is refracted at an incident angle ($\theta$), and sends it to the inside of the light-exiting element VHOE.

It is desirable that the incident angle ($\theta$) of the traveling light 200 is greater than the total reflection critical angle TVHOE_LR1 at the interface between the light-exiting element VHOE and the first low refractive index layer LR1. Likewise, it is desirable that the incident angle ($\theta$) of the traveling light 200 is greater than the total reflection critical angle TVHOE_LR2 at the interface between the light-exiting element VHOE and the second low refractive index layer LR2.

For example, if the cover substrate CP and the light-exiting element VHOE have a refractive index of 1.5 and the first low refractive index layer LR1 and the second low refractive index layer LR2 have a refractive index of 1.4, the total reflection critical angle TVHOE_LR1 at the interface between the light-exiting element VHOE and the first low refractive index layer LR1 and the total reflection critical angle TVHOE_LR2 at the interface between the light-exiting element VHOE and the second low refractive index layer LR2 are around 69 degrees. Accordingly, it is desirable that the incident angle ($\theta$) is greater than 69 degrees. For example, the incident angle ($\theta$) may be set to range from 70 to 75 degrees.

The light-exiting element VHOE converts a certain amount of traveling light 200 into outgoing light 300 having a reflection angle ($\alpha$), and sends it to the inside of the cover substrate CP. The outgoing light 300 is light for recognizing a pattern of an image on an object touching the upper surface of the cover substrate CP. If there is no object on the surface of the cover substrate CP, the outgoing light 300 has to be totally reflected and sent to an optical sensor positioned outside the bottom of the directional light substrate SLS. That is, the outgoing light 300, after totally reflected off the upper surface of the cover substrate CP, serves as detection light 400, which exits the directional light substrate SLS.

The detection light 400 is light that is reflected off the upper surface of the cover substrate CP at a reflection angle $\alpha$. The reflection angle $\alpha$ of the detection light 400 is smaller than the incident angle (8) of the traveling light 200. Thus, the detection light 400 passes through the cover substrate CP and the first low refractive index layer LR1 and then passes through the light-exiting element VHOE and the second low refractive index layer LR2 sequentially and exits the directional light substrate SLS.

An image on an object positioned on the upper surface of the cover substrate CP may be identified by sensing the detection light 400 that exits the second low refractive index layer LR2 disposed on the lower surface of the directional light substrate SLS. Hereinafter, an image recognition device using the directional light unit explained. Particularly, a flat panel display with a fingerprint recognition sensor embedded therein will be described.

Figure 3A:
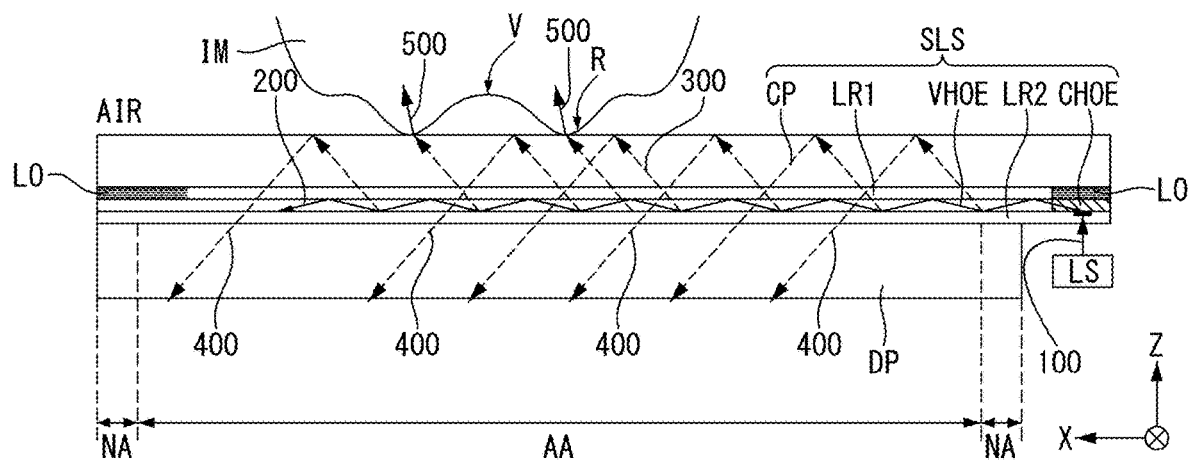
FIGS. 3A and 3B are a view showing a structure of a flat panel display with an optical image sensor embedded therein that comprises a directional light unit and an optical recognition sensor according to an exemplary embodiment of the present disclosure.
Figure 3B:
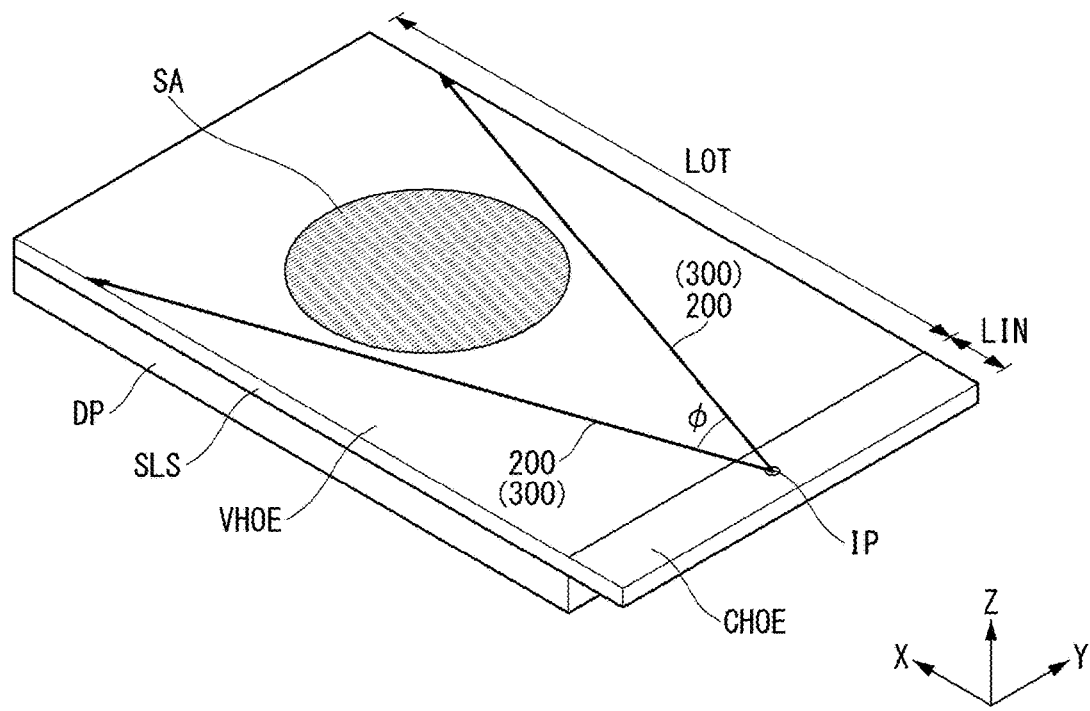

FIGS. 3A and 3B are a view showing a structure of a flat panel display with an optical image sensor embedded therein that comprises a directional light unit and an optical recognition sensor according to an exemplary embodiment of the present disclosure. Referring to FIGS. 3A and 3B, a flat panel display with an optical image sensor embedded therein according to an exemplary embodiment of the present disclosure comprises a display panel DP, a directional light substrate SLS, and a light source LS. A display area AA and a non-display area NA are defined on the display panel DP. The display area AA takes up most of the center part of the display panel DP, and the non-display area NA is disposed around the display area AA. Elements for displaying images to be presented on the display panel DP are disposed in the display area AA. Elements for driving the elements disposed in the display area AA are disposed in the non-display area NA.

Particularly, a plurality of pixel areas for displaying an image are arranged in a matrix in the display area AA. Optical sensors for image recognition are disposed in the pixel areas on a one-to-one basis. In some cases, a single optical sensor may be allocated for a number of pixel areas. For example, a single optical sensor may be allocated for every 2×2, 3×3, or 4×4 pixels.

The directional light substrate SLS has a thin and wide plate shape with a length, a width, and a thickness. Preferably, the length and width of the directional light substrate SLS may be sufficient to accommodate the display panel DP. Particularly, it is preferable that the directional light substrate SLS may be slightly larger than the overall size of the display panel DP. Preferably, the directional light substrate SLS at least has a portion that extends towards one side of the display panel DP. For example, a light source LS is disposed at the portion that extends towards one side of the display panel DP.

The directional light substrate SLS may be surface-bonded and attached to the upper surface of the display panel DP. As explained above, the directional light substrate SLS comprises a cover substrate CP, a decorative layer LO, a light-entering element CHOE, a light-exiting element VHOE, a first low refractive index layer LR1, and a second low refractive index layer LR2. Preferably, the cover substrate CP and the light-exiting element VHOE may be surface-bonded together, with the first low refractive index layer LR1 interposed between the cover substrate CP and the light-exiting element VHOE.

Preferably, the display panel DP and the directional light substrate SLS may be surface-bonded together, with the second low refractive index layer LR2 interposed between the light-exiting element VHOE and the display panel DP. Here, the upper surface of the display panel DP refers to a surface where image information provided on the display panel DP is produced. That is, it refers to a surface on the display panel DP the user will see when viewing an image.

As explained above, the directional light substrate SLS provides image detection light 400 in a downward direction, that is, towards the upper surface of the display panel DP. Then, the optical sensors of the display panel DP under the directional light substrate SLS sense the detection light 400. As a result, an image (a ridge pattern in the case of a fingerprint recognition device) on an object touching the upper surface of the directional light substrate SLS may be recognized.

More specifically, outgoing light 300 produced by the light-exiting element VHOE of the directional light substrate SLS reaches the upper surface of the cover substrate CP. Particularly, when an image object IM is in contact with the cover substrate CP, outgoing light 300, if it reaches a spot that does not make contact with the object IM, is totally reflected and provided as detection light 400 to the display panel DP. Meanwhile, outgoing light 300, if it reaches a spot that makes contact with the object IM, on the surface of the cover substrate CP, is refracted externally. At spots where an object IM with a higher refractive index than the air layer AIR is in contact with the first cover substrate CP1, the detection light 400 is not totally reflected but refracted towards the object IM. That is, at parts where the image object IM is present, the outgoing light 300 turns into absorbed light 500, and little light is provided to the optical sensors of the display panel DP.

As a result, only the detection light 400, out of the outgoing light 300, is sensed on the display panel DP, but the absorbed light 500 is not sensed. In this way, the optical sensors of the display panel DP may reproduce a pattern on an image by recognizing a reflection pattern of the detection light 400 reflected off the upper surface of the cover substrate CP.

When the directional light unit is used for a fingerprint recognition device, the image object IM is a human finger. The ridges R of the fingerprint come into contact with the surface of the cover substrate CP, but the valleys V do not come into contact with the surface of the cover substrate CP. The outgoing light 300 hitting the valleys V of the fingerprint is totally reflected and acts as a detection light 400. On the other hand, the outgoing light 300 hitting the ridges R of the fingerprint is refracted and turns into absorbed light 500 which exits the cover substrate CP.

Referring further to the perspective view in FIG. 3B, image sensing on the XY plane will be described. The incident light 100 may comprise a collimated infrared ray that has a given cross-sectional area. To this end, the light source LS may provide infrared laser light.

The incident light 100 is converted into traveling light 200 by the light-entering element CHOE. The traveling light 200 is converted in such a way that it has a spread angle ($\varphi$) on the XY plane, which is a horizontal plane consisting of an X-axis along the length and a Y-axis along the width. Also, the traveling light 200 remains collimated, as it initially was, on the XZ plane, which is a vertical plane consisting of an X-axis along the length and a Z-axis along the thickness.

Preferably, the spread angle ($\varphi$) is greater than or equal to the interior angle of two line segments connecting from the incident point IP to two end points on the other side of the cover substrate CP opposite the light-entering element CHOE. In this case, the traveling light 200 travels as it spreads out in a triangle with a spread angle ($\varphi$). Thus, the outgoing light 300 is provided over the same area as the traveling light 200. As a result, an image sensing area may be within the triangle. Accordingly, in a fingerprint recognition device, a sensing area SA may be set to correspond to the striped circle in FIG. 3.

As shown in FIG. 3B, if the sensing area SA is formed at the center of the display panel DP or at a part of the upper edge of the display panel DP, opposite the light-entering element CHOE, it is desirable that the amount of outgoing light 300 is largest in the sensing area SA. To this end, the light extraction efficiency of the light-exiting element VHOE may be designed as a function of position so that it is highest in the part corresponding to the sensing area SA and lowest or close to zero in the other parts.

First Example of Application

The present disclosure has been described so far with respect to a directional light unit for providing directional light, in a flat panel display with an optical image sensor embedded therein. Hereinafter, concrete examples of application of flat panel displays with an optical image sensor embedded therein according to the present disclosure will be described, in which a directional light unit is combined with a flat panel display comprising an optical recognition sensor.

Figure 4:
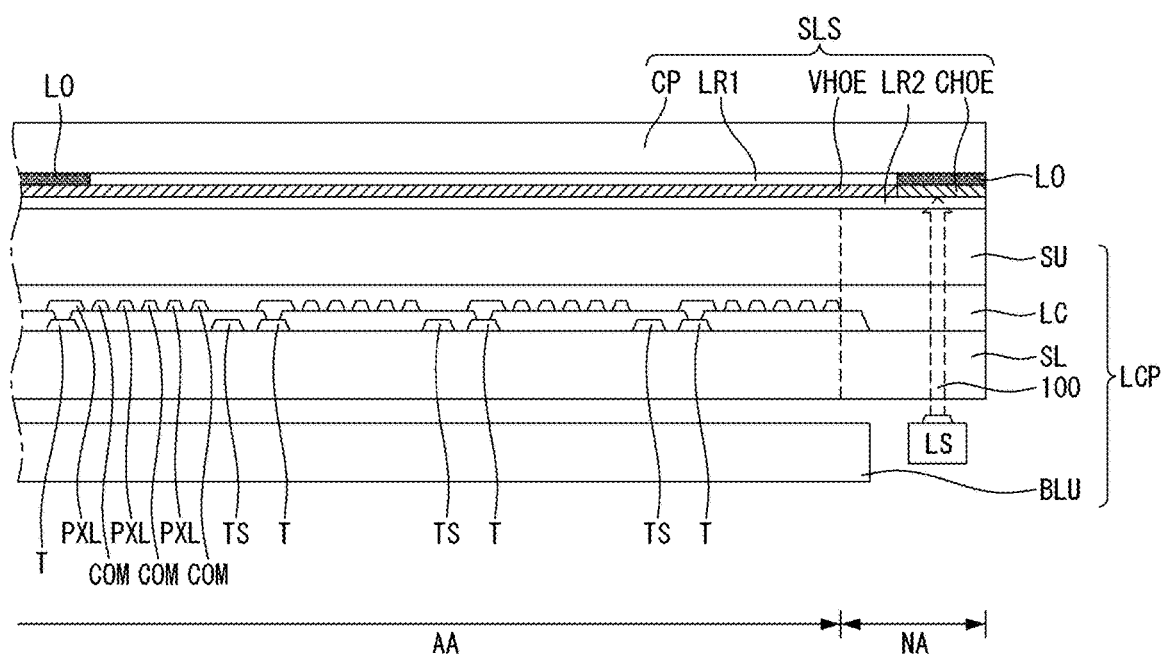
FIG. 4 is a cross-sectional view of a structure of a liquid-crystal display with an optical image sensor embedded therein that comprises a directional light unit and an optical recognition sensor according to a first example of application of the present disclosure.

Now, a description of a flat panel display with an optical image sensor embedded therein according to a first example of application of the present disclosure will be described with reference to FIG. 4. FIG. 4 is a cross-sectional view of a structure of a liquid-crystal display with an optical image sensor embedded therein that comprises a directional light unit and an optical recognition sensor according to a first example of application of the present disclosure.

A liquid-crystal display with an optical image sensor embedded therein according to the first example of application of the present disclosure comprises a liquid-crystal display panel LCP, a directional light substrate SLS, and a light source LS. The liquid-crystal display panel LCP comprises a lower substrate SL and upper substrate SU surface-bonded together and a liquid crystal layer LC interposed between them. A plurality of pixel areas are arranged in a matrix on the lower substrate SL. A plurality of color filters may be arranged on the upper substrate SU, corresponding to the pixel areas. Alternatively, the upper substrate SU may be a substrate where no special elements are formed. Here, the liquid-crystal display panel LCP shown in the drawing is horizontal electric field type. However, the present disclosure is not limited to this type and various types of liquid crystal display panels may be used.

A pixel electrode PXL for representing an image and a common electrode COM may be disposed in each pixel area. Further, a thin-film transistor T may be disposed to selectively apply an image signal to the pixel electrode PXL. An optical sensor TS may be disposed near the thin-film transistor T. At least one optical sensor TS may be disposed in each pixel area. Alternatively, a single optical sensor TS may be allocated for a number of pixel areas.

The directional light substrate SLS explained according to the exemplary embodiments of the present disclosure is surface-bonded to the top surface of the upper substrate SU of the liquid-crystal display panel LCP. The directional light substrate SLS comprises a cover substrate CP, a decorative layer LO, a light-entering element CHOE, a light-exiting element VHOE, a first low refractive index layer LR1, and a second low refractive index layer LR2. The second low refractive index layer LR2 of the directional light substrate SLS is surface-bonded to the upper surface of the upper substrate SU of the liquid-crystal display panel LCP.

The liquid-crystal display panel LCP is a non-self-emissive display device which emits no light itself. In this case, a backlight unit BLU may be disposed under the lower substrate SL. The light source LS may be disposed at one side of the backlight unit BLU to face the light-entering element CHOE. In this case, the light source LS may be formed integrally with the backlight unit BLU. Alternatively, the light source LS may be manufactured as a separate component and disposed near the backlight unit BLU.

The liquid-crystal display panel LCP comprises a display area AA and a non-display area NA. The light-exiting element VHOE of the directional light substrate SLS is disposed to correspond to the display area AA. The light-entering element CHOE id disposed to correspond to the non-display area NA. Moreover, the light source LS is disposed to face the light-entering element CHOE, in the non-display area NA. Preferably, the decorative layer LO is disposed to correspond to the non-display area NA.

Second Example of Application

Figure 5:
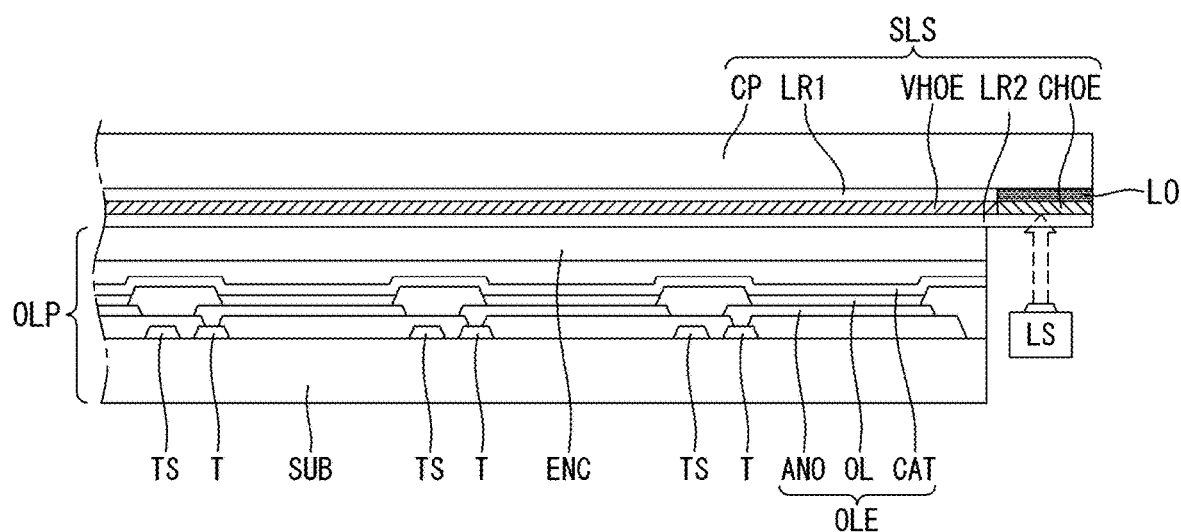
FIG. 5 is a cross-sectional view of a structure of a liquid-crystal display with an optical image sensor embedded therein that comprises a directional light unit and an optical recognition sensor according to a second example of application of the present disclosure.

Now, a description of a flat panel display with an optical image sensor embedded therein according to a second example of application of the present disclosure will be described with reference to FIG. 5. FIG. 5 is a cross-sectional view of a structure of a liquid-crystal display with an optical image sensor embedded therein that comprises a directional light unit and an optical recognition sensor according to a second example of application of the present disclosure.

An organic light-emitting diode display with an optical image sensor embedded therein according to the second example of application of the present disclosure comprises an organic light-emitting diode display panel OLP, a directional light substrate SLS, and a light source LS. In the organic light-emitting diode display panel OLP, a substrate SUB on which display elements are disposed and an encapsulator ENC for protecting the display elements are surface-bonded together. A plurality of pixel areas are arranged in a matrix on the substrate SUB. A plurality of color filters may be arranged on the encapsulator ENC, corresponding to the pixel areas. Alternatively, the encapsulator ENC may be a substrate where no special elements are formed. Here, the organic light-emitting diode display panel OLP shown in the drawing is top-emission type. However, the present disclosure is not limited to this type and other various types of organic light-emitting diode display panels may be used.

An organic light-emitting diode OLE for representing an image and a thin-film transistor T for selectively applying an image signal to the organic light-emitting diode OLE may be disposed in each pixel area. The organic light-emitting diode OLE comprises an anode ANO, an organic emission layer OL, and a cathode CAT. An optical sensor TS may be disposed near the thin-film transistor T. At least one optical sensor TS may be disposed in each pixel area. Alternatively, a single optical sensor TS may be allocated for a number of pixel areas.

The directional light substrate SLS explained in the exemplary embodiments of the present disclosure is surface-bonded to the top surface of the encapsulator ENC of the organic light-emitting diode display panel OLP. The directional light substrate SLS comprises a cover substrate CP2, a decorative layer LO, a light-entering element CHOE, a light-exiting element VHOE, a first low refractive index layer LR1, and a second low refractive index layer LR2. The second low refractive index layer LR2 of the directional light substrate SLS is surface-bonded to the upper surface of the encapsulator ENC of the organic light-emitting diode display panel OLP.

The organic light-emitting diode display panel OLP is a self-emissive display device which emits light itself. In this case, no backlight unit BLU is required. Thus, it is preferable that the light source LS is disposed at one side of the organic light-emitting diode display panel OLP to face the light-entering element CHOE.

Specifically, the organic light-emitting diode display panel OLP comprises a display area AA and a non-display area NA. Preferably, the directional light substrate SLS is larger in size than the organic light-emitting diode display panel OLP. The light-exiting element VHOE of the directional light substrate SLS is disposed to correspond to the display area AA. The light-entering element CHOE is disposed to cover the top of a space extending from the side of the organic light-emitting diode display panel OLP. The light source LS may be disposed in a lower part of the space. Preferably, the decorative layer LO may be disposed in the non-display area NA.

Moreover, the organic light-emitting diode display may further comprise a polarizer on the outer surface of the organic light-emitting diode display panel, in order to prevent distortion of image information caused by reflection of external light. Although not shown, the polarizer may be interposed between the second low refractive index layer LR2 of the directional light substrate SLS and the upper surface of the encapsulator ENC of the organic light-emitting diode display panel OLP. In this case, the organic light-emitting diode display with an optical image sensor embedded therein may be finished by a process of attaching a polarizer to the upper surface of the organic light-emitting diode display panel and bonding the directional light substrate SLS on the polarizer.

Alternatively, the polarizer may be interposed between the cover substrate CP and first refractive index layer LR1 of the directional light substrate SLS. In this case, the organic light-emitting diode display with an optical image sensor embedded therein may be finished by forming the directional light substrate SLS, with the polarizer interposed between the cover substrate CP and the first low refractive index layer LR1, and then bonding the organic light-emitting diode display panel and the directional light substrate SLS together.

In this way, a display device with an optical image sensor embedded therein according to the present disclosure comprises a cover substrate attached to the outer surface of the display and an ultrathin holographic film only several hundreds μm attached to one surface of the cover substrate. Accordingly, the optical image sensor may be embedded without affecting the thickness of the display device. Moreover, an image can be sensed by spreading (scanning) highly collimated light evenly over the entire area of the display panel of the display device, and this may lead to a very high resolution for image recognition, allowing for accurate sensing of fine images, as in fingerprint recognition.

A display device with an optical image sensor embedded therein according to the present disclosure is characterized in that a cover glass of the display device is used as a means for providing light for image recognition. Particularly, the light-exiting element VHOE generates outgoing light 300 and at the same time directs traveling light 200 across a detection area.

It will be apparent to those skilled in the art that various modifications and variations can be made in the flat panel display with an optical sensor embedded therein of the present disclosure without departing from the technical idea or scope of the disclosure. Thus, it is intended that the present disclosure cover the modifications and variations of this disclosure provided they come within the scope of the appended claims and their equivalents.

What is claimed is:

1. A flat panel display with an optical image sensor embedded therein, comprising:
   a display panel on which a display area and a non-display area are defined; and
   a directional light unit with a length and width for accommodating the display panel and a given thickness, that is attached to the upper surface of the display panel,
   wherein the directional light unit comprises:
   a cover substrate with a surface area corresponding to the length and width;
   a first low refractive index layer attached to the lower surface of the cover substrate;
   a light-exiting element disposed to correspond to the display area, on the lower surface of the first low refractive index layer;
   a light-entering element disposed outside the display area at one side of the light-exiting element, on the lower surface of the first low refractive index layer;
   a second low refractive index layer disposed on the lower surfaces of the light-exiting element and light-entering element and attached to the upper surface of the display panel; and
   a light source disposed to face the light-entering element, wherein the first low refractive index layer and the second low refractive index layer have a same refractive index that is higher than a refractive index of air and is lower than a refractive index of the light-exiting element.

2. The flat panel display of claim 1, wherein
   the light source provides incident light to an incident point defined on the light-entering element,
   the light-entering element comprises a holographic pattern that converts the incident light into traveling light with an incident angle so that the traveling light is totally reflected within the light-exiting element and enters the light-exiting element, and
   the light-exiting element comprises a holographic pattern that converts some of the traveling light into detection light with a reflection angle so that the detection light is totally reflected off the upper surface of the cover substrate and passes through the first low refractive index layer and the second low refractive index layer.

3. The flat panel display of claim 2, wherein the incident angle is greater than the total reflection critical angle at the interface between the light-exiting element and the second low refractive index layer and greater than the total reflection critical angle at the interface between the light-exiting element and the first low refractive index layer.

4. The flat panel display of claim 2, wherein the reflection angle is greater than the total reflection critical angle at the interface between the cover substrate and an air layer and smaller than the total reflection critical angle at the interface between the light-exiting element and the second low refractive index layer.

5. The flat panel display of claim 2, wherein the traveling light has a spread angle on a horizontal plane consisting of an axis along the width and an axis along the length of the directional light unit, and remains collimated as initially on a vertical plane consisting of an axis along the length and an axis along the thickness of directional light unit.

6. The flat panel display of claim 5, wherein the spread angle is greater than or equal to the interior angle of two line segments connecting from the incident point to two end points on the other side of the cover substrate opposite the light-entering element.

7. The flat panel display of claim 1, further comprising a decorative layer disposed on at least either one side or the other side of the lower surface of the cover substrate, corresponding to the non-display area.

8. The flat panel display of claim 7, wherein the light-entering element and the light source are disposed under the decorative layer.

* * * * *